United States Patent
Halcomb

[15] 3,643,819
[45] Feb. 22, 1972

[54] DISTRIBUTOR FOR SILAGE OR THE LIKE

[72] Inventor: Winston C. Halcomb, Route 2, Richmond, Ky. 40745

[22] Filed: Sept. 21, 1970

[21] Appl. No.: 73,944

[52] U.S. Cl..........................214/17 CB, 198/128, 239/687, 302/60
[51] Int. Cl.......................................................B65g 65/32
[58] Field of Search.................214/17 CB; 302/60; 239/687; 198/128

[56] References Cited

UNITED STATES PATENTS

| 1,691,683 | 11/1928 | Townsend | 302/60 X |
| 3,490,618 | 1/1970 | Buschbom | 214/17 CB |

Primary Examiner—Robert G. Sheridan
Attorney—Frank C. Leach, Jr.

[57] ABSTRACT

A pyramidal-shaped body is rotatably mounted beneath the outlet end of a silage supply pipe. Each side of the body has a fin thereon with the fin being slightly divergent to a junction between the side of the body on which the fin is mounted and an adjacent side of the body remote from the fin. The body is adjustably positioned relative to the outlet end of the supply pipe in both vertical and angular directions.

10 Claims, 5 Drawing Figures

PATENTED FEB 22 1972

3,643,819

INVENTOR
WINSTON C. HALCOMB

BY Frank C. Leach Jr.
ATTORNEY

DISTRIBUTOR FOR SILAGE OR THE LIKE

In filling a silo with silage, it is necessary that the silage be substantially evenly distributed throughout the area of the silo. Otherwise, air pockets, which cause spoilage, for example, will exist. Therefore, it is necessary that the silage be substantially equally distributed throughout the silo.

One previously suggested silage distributor has utilized an electric motor driven device for distributing the silage. However, this motor driven device is relatively expensive. Furthermore, the motor requires electricity, and this is not always available at a silo.

Another structure for distributing the silage in a silo is shown in U.S. Pat. No. 1,691,683 to Townsend. The Townsend patent utilizes a conical body having spiral impeller blades on its outer surface for rotating the body when the silage and the pressurized air conveying the silage impinge on the impeller blades. Each of the impeller blades has a scattering blade pivoted at the lower end of the impeller blade to direct the silage throughout the silo.

The scattering blades of the structure of the Townsend patent are disposed beneath the bottom of the conical body and must contact the silage as it moves off the bottom of the conical body. Thus, each of the scattering blades can only distribute the portion of the silage that it can contact. With relatively heavy silage, the amount of contact of each of the scattering blades with the silage is reduced.

Furthermore, the conical body of the Townsend patent must be arranged so that the longitudinal axis through the apex of the conical body is parallel to the longitudinal axis of the silo. Otherwise, one of the scattering blades would not receive a significant amount of the silage.

U.S. Pat. No. 1,729,341 to Johnson discloses a silage distributor having a spreading cone disposed beneath the outlet of a supply pipe to spread the silage onto a plurality of pitched blades, which rotate due to the silage striking the blades. As the silage slides on the spreading cone, it can fall between the blades, particularly if the silage is relatively heavy.

The structure of the Johnson patent also requires that the axis of rotation of both the pitched blades and the spreading cone be vertical. Thus, the silage distributor of the Johnson patent can be employed with a supply pipe having its outlet arranged so that the silage is directed therefrom only in a vertical direction parallel to the longitudinal axis of the silo.

However, all supply pipes are not mounted so that the silage flowing therefrom exits in a vertical direction and parallel to the longitudinal axis of the silo. Thus, the structures of the Johnson and Townsend patents are limited as to the types of supply pipes with which they can be employed.

The present invention satisfactorily solves the foregoing problems by providing a relatively inexpensive distributor that is capable of distributing silage sufficiently equal throughout a silo irrespective of whether the silage is directed vertically from the outlet of the supply pipe and irrespective of whether the silage is light or heavy. The present invention utilizes a single body with fins thereon to produce the desired results.

The body of the distributor of the present invention is shaped so that it functions to distribute the silage without the requirement of any separate set of blades as in the Townsend patent or separate spreading cone as in the Johnson patent. By utilizing the body to exert the centrifugal force on the silage, all of the silage, irrespective of whether it is light or heavy, is effectively distributed substantially equally throughout the area of the silo.

Since the present invention utilizes only the single body for distributing the silage, the body may be disposed with its axis other than vertical. Thus, the distributor of the present invention does not require the silage to be directed vertically and parallel to the longitudinal axis of the silo when the silage exits from the outlet of the supply or conveyor pipe for the silage to be substantially equally distributed throughout the area of the silo.

An object of this invention is to provide a distributor for silage or the like to substantially equally distribute the silage in a silo or the like.

Another advantage of this invention is to provide a distributor for silage or the like that may be used with silos or the like of different diameters while obtaining substantially equal distribution of the silage or the like throughout the silo or the like.

Other objects of this invention will be readily perceived from the following description, claims, and drawing.

This invention relates to a distributor for silage or the like including a pyramidal-shaped body having a plurality of sides meeting in a vertex with means to rotatably mount the body. Each of the sides of the body has a fin mounted on its outer surface. Each of the fins is disposed at an angle to a junction between the side of the body on which the fin is mounted and the side of the body closest to the fin so that the fin cooperates with a junction between the side of the body on which the fin is mounted and the side of the body remote from the fin to form a path for the silage. Each of the fins extends to substantially the base end of the side of the body.

The attached drawing illustrates a preferred embodiment of the invention, in which.

Figure 1:
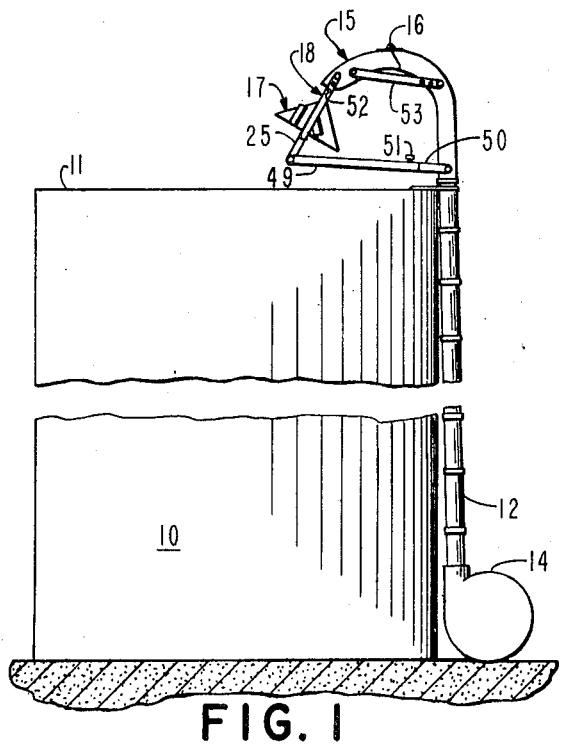
FIG. 1 is a side elevational view of a silo into which silage is distributed by using a distributor of the present invention.
Figure 2:
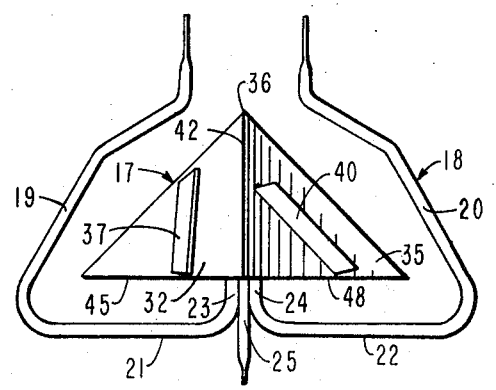
FIG. 2 is an elevational view of the distributor of the present invention and its support for attachment to the discharge or outlet spout of a supply pipe.
Figure 5:
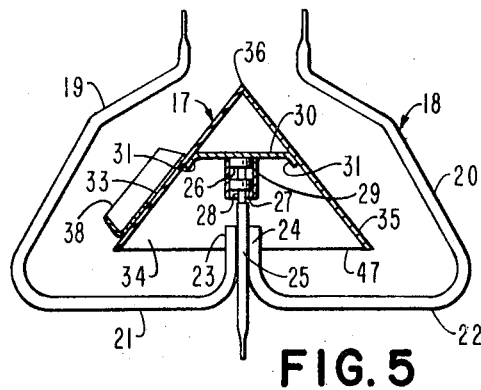
FIG. 5 is an elevational view, partly in section, showing the rotatable mounting support for the distributor of the present invention and the cooperating portion of the distributor.

Referring to the drawing and particularly FIG. 1, there is shown a silo 10 having an opening 11 at its upper end into which silage may be supplied from a supply or conveyor pipe 12. The supply or conveyor pipe 12, which comprises a plurality of sections of pipe supported by the silo 10, extends upwardly from a blower 14 and has a discharge or outlet spout 15, which comprises two portions pivotally connected to each other at 16, connected to its upper end.

the distributor of the present invention comprises a pyramidal shaped body 17, which is supported adjacent the outlet end of the discharge or outlet spout 15 but in spaced relation thereto by a support 18. The support 18 includes a pair of arms 19 and 20 (see FIGS. 2 and 5), which are pivotally mounted on opposite sides of the discharge or outlet spout 15 of the conveyor or supply pipe 12 by bolts and nuts, for example. The arms 19 and 20 are integral with horizontal portions 21 and 22, respectively, of the support 18. The inner ends of the horizontal portions 21 and 22 terminate in vertical portions 23 and 24, respectively. An upstanding hollow rod 25 is secured between the vertical portions 23 and 24 so that the rod 25 joins the vertical portions 23 and 24 to each other.

Figure 4:
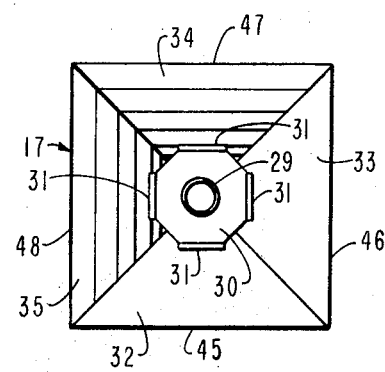
FIG. 4 is a bottom plane view of the distributor of the present invention.

The body 17 is rotatably mounted on bearings 26 and 27 (see FIG. 5) on a rod 28, which is disposed within the hollow rod 25 and secured thereto. The body 17 has a hub 29, which is a hollow collar, for example, supported by a plate 30 so that the upper end of the upper bearing 26 abuts against the bottom of the plate 30 and the hub 29 receives the bearings 26 and 27. The plate 30 is fixed to the body 17 by having flanges 31 (see FIG. 4) welded, for example, to inner surfaces of sides 32, 33, 34, and 35 of the body 17.

The pyramidal-shaped body 17 has a square shaped bottom or base. It should be understood that the body 17 may have its bottom or base in other polygonal shapes such as triangular, for example, as long as each side of the bottom or base is of substantially the same length. Of course, the length of each side of a triangular shaped base would be different than the length of each side of a square shaped base.

The body 17 has the four sides 32, 33, 34, and 35 secured to each other and terminating in a vertex 36. The vertex 36 is pointed towards the outlet of the discharge or outlet spout 15 of the supply pipe 12.

Each of the sides 32, 33, 34, and 35 has a fin 37, 38, 39, and 40, respectively, mounted on its outer surface by being welded thereto, for example. Each of the fins 37–40 has a flange that is welded, for example, to the outer surface of the side of the body 17 on which the fin is mounted and an upstanding portion against which the silage and the pressurized air from the outlet of the spout 15 impinge to rotate the body 17 about the longitudinal axis of the rod 28.

The fin 37 is disposed at an angle of approximately 60° to a junction 41 between the sides 32 and 33 and slightly divergent to a junction 42 between the sides 32 and 35. Thus, the fin 37 is almost parallel to the junction 42 between the side 32 on which it is mounted and the side 35, which is remote from the fin 37.

The fin 38 is disposed on the side 33 at an angle of about 60° to a junction 43 between the sides 33 and 34 and slightly divergent, although almost parallel, to the junction 41. The fin 39, which is mounted on the side 34, is disposed at an angle of approximately 60° to a junction 44 between the sides 34 and 35 and slightly divergent, although almost parallel, to the junction 43. The fin 40 is mounted on the side 35 at an angle of about 60° to the junction 42 and slightly divergent, although almost parallel, to the junction 44.

One end of the fin 37 extends to substantially bottom or base end 45 of the side 32 while its other end terminates short of the junction 41. One end of the fin 38 is disposed adjacent bottom or base end 46 of the side 33 of the body 17 while its other end stops short of the junction 43. The fin 39 has one end extending to substantially bottom or base end 47 of the side 34 of the body 17 and its other end terminating short of the junction 44. The fin 40 has one end disposed adjacent bottom or base end 48 of the side 35 while its other end stops short of the junction 42.

As previously mentioned, the support 18 is pivotally mounted on the discharge or outlet spout 15 of the conveyor or supply pipe 12. The support 18 must be held in the position to which it is adjusted.

Accordingly, means is disposed between the support 18 and a portion of the conveyor or supply pipe 12 to cooperate with each to retain the support 18 in the desired position. The retaining means includes a first hollow rod 49 (see FIG. 1), which is pivotally connected to the support 18 by being pivotally connected to the rod 25 through a bolt and nut, for example. The retaining means includes a second rod 50, which is slidably disposed within the first hollow rod 49 and has its free end pivotally connected to the nonpivotal portion of the spout 15 by a bolt and nut, for example. A setscrew 51 extends through a threaded opening in the first hollow rod 49 to engage the second rod 50 to maintain the rods 49 and 50 in the desired position.

When it is desired to adjust the position of the support 18 relative to the discharge or outlet spout 15 of the supply pipe 12 so as to maintain the longitudinal axis of the body 17 substantially perpendicular to the plane of the outlet of the spout 15 when the pivotal portion of the spout 15 is adjusted for a different diameter of the silo 10, the setscrew 51 is released. Then, the support 18 is pivoted to the desired position relative to the spout 15 to which the support 18 is pivotally connected through sliding the first hollow rod 49 relative to the second rod 50. When the body 17 is in the desired position relative to the discharge or outlet spout 15 so that the longitudinal axis of the body 17 is parallel to the discharge of the silage from the spout 15, the setscrew 51 is tightened to retain the body 17 in the desired position relative to the discharge or outlet spout 15 of the supply pipe 12.

Considering the operation of the present invention, the movable portion of the discharge or outlet spout 15 is pivoted about the pivotal connection 16 in accordance with the diameter of the silo 10 through an attendant climbing a ladder on the silo 10. As the diameter of the silo 10 increases, the pivotal portion of the discharge or outlet portion 15 is pivoted clockwise to properly dispose the discharge or outlet spout 15 with respect to the silo 10.

The support 18 is then pivoted relative to the discharge or outlet spout 15 by the attendant after initially releasing the adjusted setscrew 51. When the support 18 has been pivoted so that the longitudinal axis of the body 17 is perpendicular to the outlet of the discharge or outlet spout 15, this will produce substantially equal distribution of the silage. In this position of the body 17, the setscrew 51 is tightened to lock the body 17 in this position.

Figure 3:
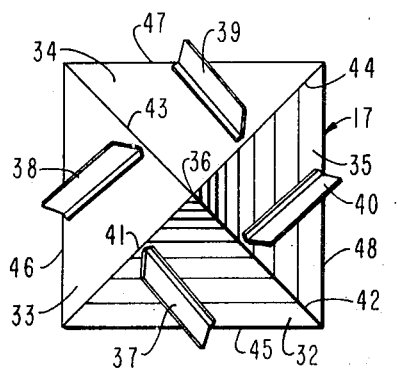
FIG. 3 is a top plan view of the distributor of the present invention.

When the silage is supplied through the supply pipe 12 to the discharge or outlet spout 15 by the blower 14, the force of the silage and the pressurized air emerging from the discharge or outlet spout 15 strikes the upstanding portions of the fins 37 to 40 on the body 17 to cause clockwise (as viewed in FIG. 3) rotation of the body 17 about the longitudinal axis of the rod 28. The silage, which moves between the fin 37 and the junction 42, is slung to the outer wall of the silo 10 due to the portion of the side 32 between the fin 37 and the junction 42 exerting a centrifugal force on the silage. The same arrangement simultaneously exists for all of the other fins 38 to 40 and the portions of the sides of the body 17 on which they are mounted adjacent the trailing junctions.

By disposing the lower end of each of the fins 37 to 40 so that it is not forward of the center of the length of the bottom end of the side on which the fin is mounted, any portion of the bottom end of the side on which the fin is mounted beyond the fin swings through a bigger arc about the longitudinal axis of the rod 28 than the bottom of the fin with the point at each of the junctions having the biggest arc of rotation. Accordingly, the silage is substantially equally distributed by the body 17 over the entire area of the silo 10 because of the force exerted on the silage by the portions of the side having a greater rotating arc than the fin.

Thus, the pyramidal shape of the body 17 in conjunction with the fins 37 to 40 results in substantially equal distribution of the silage over the entire area of the silo 10. Furthermore, as the weight of the silage increases, the speed of rotation of the body 17 increases to provide a greater momentum to the heavier silage so that an increase in weight of the silage does not prevent substantially equal distribution of the silage over the entire area of the silo 10.

The pyramidal-shaped body 17 is effective irrespective of the diameter of the silo since the vertex 36 of the body 17 can be adjustably positioned relative to the discharge or outlet spout 15 of the supply pipe 12 through openings 52 in the arms 19 and 20 of the support 18. Thus, this adjustment enables there to always be substantially equal distribution throughout the silo 10 irrespective of its diameter.

While the present invention has shown and described the silo 10 as having an opening 11 in its upper end, it should be understood that the silo 10 could have a roof thereon with an opening therein through which the spout 15 and the body 17 could be inserted. The operation would be the same as that described.

It should be understood that the spout 15 is adjustably held in any position to which the pivotal portion is moved about the pivotal connection 16. Thus, the pivotal portion of the spout 15 does not move after it has been positioned at the desired location relative to the vertical portion of the supply pipe 12.

The pivotal portion of the spout 15 is held in the adjusted position by a bar or rod 53 on each side between the two portions of the spout 15. Each of the bars or rods 53 has a plurality of openings to receive a bolt or the like in the nonpivotal portion of the spout 15 to adjust the position of each of the bars 53 with the adjustment of the pivotal portion of the discharge or outlet spout 15.

As previously mentioned, each of the fins 37 to 40 is slightly divergent to a cooperating junction. This divergence is such that the bottom end of the fin is further from the junction than the top end of the fin.

An advantage of this invention is that silage can be substantially equally distributed throughout the silo. Another advantage of this invention is that it is relatively inexpensive. A further advantage of this invention is that it may be readily utilized with silos of various diameters.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. A distributor for silage or the like including:
    a pyramidal-shaped body having a plurality of sides meeting in a vertex;
    means to rotatably mount said body;
    each of said sides of said body has a fin mounted on its outer surface;
    each of said fins being disposed at an angle to a junction between said side of said body on which said fin is mounted and said side of said body closest to said fin so that said fin cooperates with a junction between said side of said body on which said fin is mounted and said side of said body remote from said fin to form a path for the silage;
    and each of said fins extending to substantially the base end of said side of said body.

2. The distributor according to claim 1 including:
    means to support said body on a silage supply pipe or the like;
    said support means including one portion of said rotatably mounting mean;
    and said body having the other portion of said rotatably mounting means for cooperation with said one portion of said rotatably mounting means.

3. The distributor according to claim 2 in which:
    said support means includes means to pivotally mount said body on the supply pipe or the like to adjust the position of said body relative to the supply pipe or the like by pivoting said support means about said pivotal mounting means to dispose the longitudinal axis of said body parallel to the discharge path of the silage from the supply pipe or the like;
    and means cooperating with said support means and the supply pipe or the like to retain said body in its adjusted position.

4. The distributor according to claim 3 in which each of said fins has its end that extends to substantially the base end of said side of said body disposed at least half the length of the bottom end of said side from the bottom end of the junction that has the other end of said fin disposed adjacent thereto.

5. The distributor according to claim 2 in which said support means includes means to adjust the distance of the vertex of said body from the outlet of the supply pipe or the like.

6. The distributor according to claim 2 in which said body has a polygonal-shaped base with each side of the base having substantially the same length.

7. The distributor according to claim 2 in which said body has a square-shaped base.

8. The distributor according to claim 1 in which said body has a polygonal-shaped base with each side of the base having substantially the same length.

9. The distributor according to claim 1 in which said body has a square-shaped base.

10. The distributor according to claim 1 in which each of said fins has its end that extends to substantially the base end of said side of said body disposed at least half the length of the bottom end of said side from the bottom end of the junction that has the other end of said fin disposed adjacent thereto.

* * * * *